Sept. 24, 1946.   L. F. HOFER   2,408,168
REAR VIEW MIRROR
Filed June 5, 1944
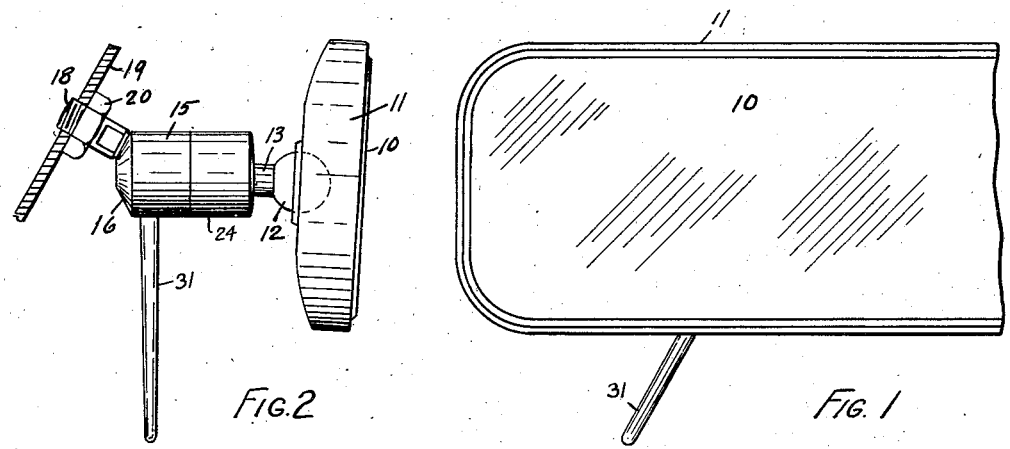
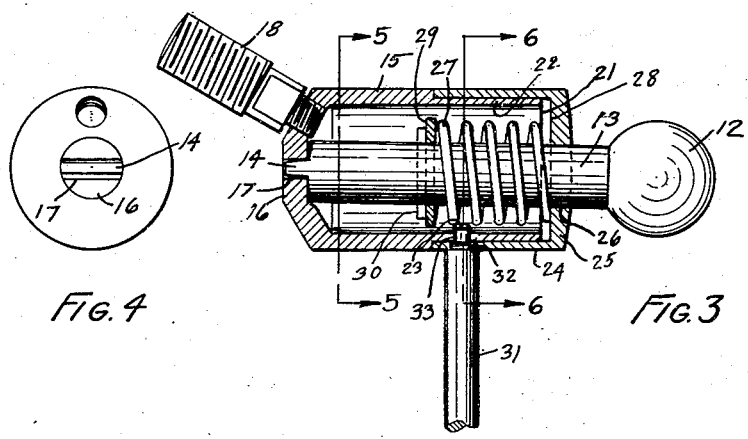
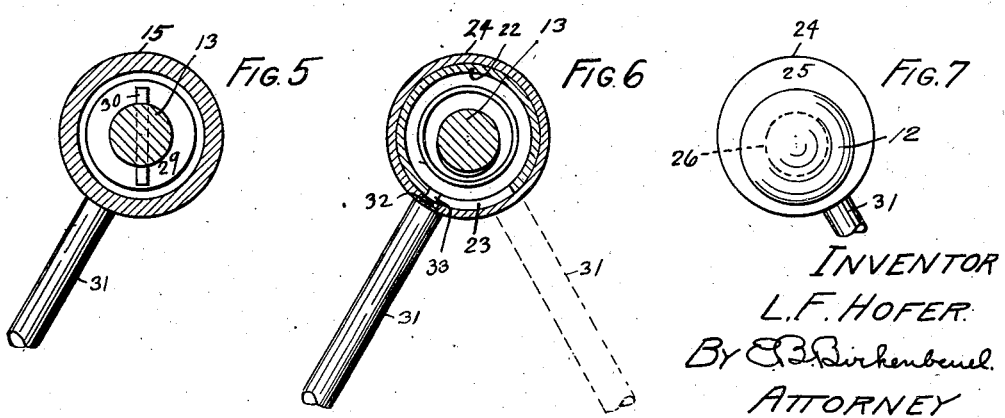
INVENTOR
L. F. HOFER.
By E. B. Birkenbeuel
ATTORNEY Patented Sept. 24, 1946

2,408,168

UNITED STATES PATENT OFFICE 2,408,168

REARVIEW MIRROR

Laurence F. Hofer, Oswego, Oreg.

Application June 5, 1944, Serial No. 538,752

3 Claims. (Cl. 88—98)

This invention relates generally to the automotive industry and particularly to a rear view mirror.

The main object of this invention is to devise a means for quickly and easily moving a rear view mirror to and from a viewing position.

The second object is to provide a means for temporarily moving a rear view mirror out of a viewing position and back to the same viewing position without interfering with its normally adjusted setting.

The third object is to provide a rear view mirror and bracket therefor which have substantially the same external appearance as do those standard forms now in common use, and which permit the mirror to be moved into a rear viewing position by manually overcoming the resistance of a holding clamp, in addition to which I provide a means for moving the mirror manually without disturbing the frictionally held setting.

Attention is drawn to my former patent, No. 2,052,770, over which the device described herein is an improvement.

I accomplish these and further objects in the manner set forth in the following specification as illustrated in the accompanying drawing, in which:

Fig. 1 is a fragmentary front elevation of the mirror showing the operating lever in a normal driving position.

Fig. 2 is a side elevation of the device, showing the support cut away in section.

Fig. 3 is a longitudinal section through the device.

Fig. 4 is an end elevation of Fig. 3 with the stud bolt removed.

Fig. 5 is a transverse section taken along the line 5—5 in Fig. 3.

Fig. 6 is a transverse section taken along the line 6—6 in Fig. 3.

Fig. 7 is an end elevation of the device from the mirror supporting end.

Similar numbers refer to similar parts throughout the several views.

Referring in detail to the drawing, there is shown a rear view mirror 10 having the usual enclosing frame 11, to which is attached the spherical end 12 of the device which I am about to describe. It will be understood that the catch between the end 12 and the casing 11 is such as to permit the manual adjustment of the mirror 10 with relation to the end 12 by merely overcoming the friction between the parts.

Integral with the end 12 is the arm 13 which is circular in cross section and has formed on the opposite end thereof a somewhat tapered tang 14.

The arm 13 extends into a tubular body 15 whose closed end 16 is provided with an elongated slot 17, which receives the tank 14 in a manner to permit the arm 13 to have a limited rocking motion in any direction. The body 15 may be supported in any desired manner, but as illustrated, is provided with a stud bolt 18. As illustrated, the bolt 18 is threaded into the support 19 and locked thereto by means of a nut 20. The open end 21 of the body 15 has a small reduced external diameter for somewhat less than half its length. The portion 22, having the reduced diameter, is provided with a slot 23 which extends transversely around a part of the body portion 22.

I provide a cap 24 which is rotatable on the portion 22 and has a closed end 25 for the arm 13. The opening 26 is somewhat eccentric with relation to the axis of the cap 24. The arm 13 passes through the hole 26 and has placed thereon a spring 27 which is held in compression between the inner side 28 of the closed end 25 and the washer 29 which is placed on the arm 13 and held in position by means of the pin 30, which passes through the arm 13. An operating lever 31 has a reduced threaded end 32, which is threaded into the cap 24 and tip 33 which is slidable within the slot 23. The tip 33 holds the cap 24 in place, acts as a stop for the movements of the lever 31 and holds the entire device in assembled relationship.

It will be seen upon inspection of Fig. 3 that the spring 27 holds the parts in their proper relationship, prevents rattling and also provides the necessary amount of friction to insure the proper operation of the device.

The operation of the device is as follows:

Assuming that the mirror has been placed in the position shown in Fig. 2, which is the position for normal driving, in which the driver has a view through the rear window of the car, and that owing to a glare of natural or artificial lights shining through the rear window it is desired to momentarily put the mirror 10 out of a reflecting position, all that the driver needs to do is to move the lever 31 from the full line to the dotted line position shown in Fig. 6, which action causes the cap 24 to revolve and to move the eccentric journal for the arm 13 to a different position, that is, to swing the arm 13 on its pivot end. When the need for this change has passed, it is only necessary to return the lever 31 to its original position as shown in full line in Fig. 1.

The need for a device of this kind has been answered in many different ways and I am therefore not claiming such devices broadly, but I do intend to cover all such forms and modifications thereof as fall fairly within the appended claims:

I claim:

1. In a device of the class described, the combination of a rigidly mounted cylindrical body, a mirror supporting arm with said body having one end pivotally and non-rotatably supported therein, a rotatable cylindrical cap for said body having a hole formed therein eccentric with relation to the axis of the body, said hole being capable of supporting one end of said arm, means for limiting the rotation of said cap in one direction and a lever for rotating said cap on said body for the purpose of changing the inclination of said arm.

2. In a device of the class described, the combination of a fixed tubular body having a cylindrical cap therefor having a limited rotatable movement, said cap having a hole formed therein spaced from the longitudinal axis of the cap, an arm projecting through the hole in said cap and means for pivotally and non-rotatably mounting one end thereof within the body, means for frictionally supporting a mirror on the projecting end of said arm, and a lever for rotating said cap for the purpose of varying the position of the axis of said arm.

3. In a device of the class described, the combination of a fixed tubular body, an arm disposed within said body having one end thereof pivotally and non-rotatably mounted within the body, a cylindrical cap for said body having an opening in the end thereof eccentric with relation to the axis of the cap and forming a journal for said arm means for limiting the rotation of said cap, the portion of said arm which projects through said cap having a ball formed thereon, a mirror mounted on the ball end of said arm, a means for rotating said cap with relation to said body, and a spring on said arm disposed to urge the ball end of said arm toward said cap.

LAURENCE F. HOFER.